United States Patent
Chen

(10) Patent No.: US 9,440,517 B2
(45) Date of Patent: Sep. 13, 2016

(54) GUIDING RAIL SYSTEM FOR A CAR CURTAIN

(71) Applicant: Yin-Wen Chen, Hsinchu (TW)

(72) Inventor: Yin-Wen Chen, Hsinchu (TW)

( * ) Notice: Subject to any disclaimer, the term of this patent is extended or adjusted under 35 U.S.C. 154(b) by 19 days.

(21) Appl. No.: 14/541,144

(22) Filed: Nov. 14, 2014

(65) Prior Publication Data

US 2015/0291009 A1    Oct. 15, 2015

(30) Foreign Application Priority Data

Apr. 15, 2014   (TW) .............................. 103206551 U

(51) Int. Cl.
*B60J 1/20* (2006.01)

(52) U.S. Cl.
CPC ............ *B60J 1/2077* (2013.01); *B60J 1/2052* (2013.01)

(58) Field of Classification Search
CPC .... B60J 1/2052; B60J 1/2063; B60J 1/2077; B60J 1/208
USPC .......... 160/370.22, 269; 296/97.7, 97.8, 97.9
See application file for complete search history.

(56) References Cited

U.S. PATENT DOCUMENTS

| | | | | |
|---|---|---|---|---|
| 6,968,887 B2 * | 11/2005 | Hansen | ................... | B60J 1/2027 160/280 |
| 6,983,786 B2 * | 1/2006 | Chen | ..................... | B60J 1/2052 160/370.22 |
| 7,014,243 B2 * | 3/2006 | Nakajo | ................. | B60J 1/2019 160/370.22 |
| 7,188,659 B2 * | 3/2007 | Hansen | .................. | B60J 1/2027 160/273.1 |
| 7,967,052 B2 * | 6/2011 | Lin | ........................ | B60J 7/0015 160/273.1 |
| 8,028,738 B2 * | 10/2011 | Weinbrenner | ......... | B60J 1/2027 160/370.22 |
| 8,540,008 B2 * | 9/2013 | Chen | ..................... | B60J 1/2025 160/274 |

* cited by examiner

*Primary Examiner* — David Purol
(74) *Attorney, Agent, or Firm* — Pro-TECHTOR International Services; Ian Oglesby

(57) ABSTRACT

A guiding rail system for a car curtain comprises: a guiding rail main body in strip which is separatively set on the interior trim on both sides of a windshield, in combination with a car curtain; it is characterized in that: plural positioning parts in sheet with an U-shaped section, which have a bottom, a front clipping piece and a rear clipping piece for clipping on the destined edge of the interior trim; and plural snap pieces, wherein the first end of the snap pieces is set in the guiding rail main body, while the second end of the snap pieces is easily inserted in or detached from the gap between the front clipping piece and the interior trim, thus a guiding rail main body that is easily assembled and disassembled is achieved.

3 Claims, 6 Drawing Sheets

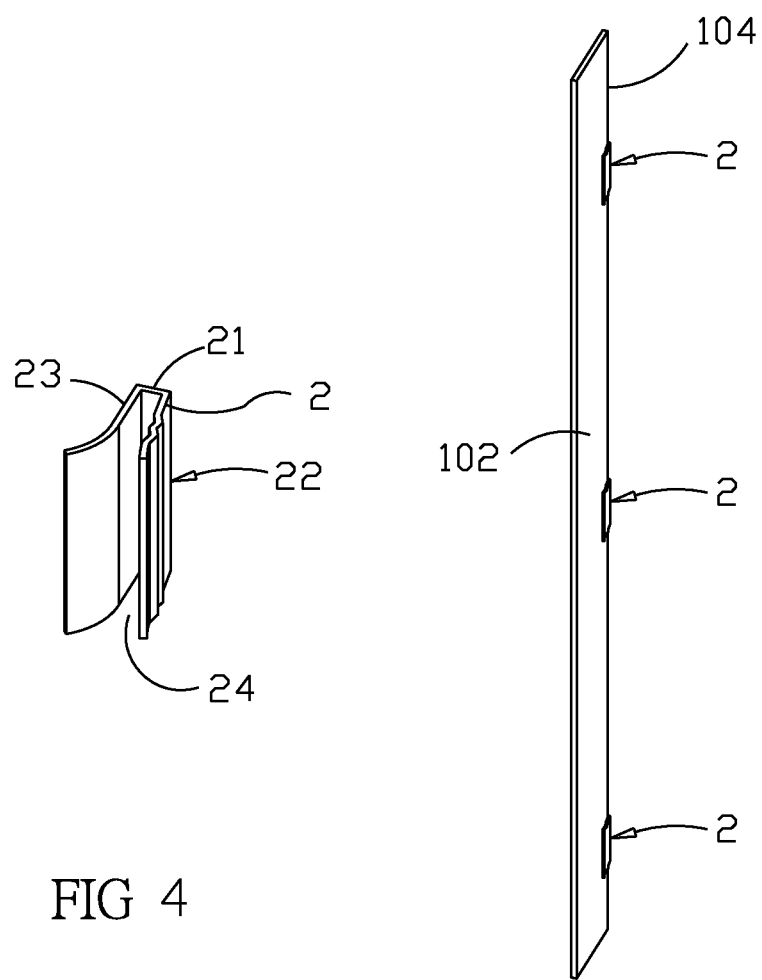

GUIDING RAIL SYSTEM FOR A CAR CURTAIN

FIELD OF THE INVENTION

The present invention relates to a guiding rail system for a car curtain, particularly to a guiding rail system for a car curtain that is easily assembled and disassembled.

BACKGROUND OF THE INVENTION

Patent Document 1: U.S. Pat. No. 8,540,008 B2.

In Patent Document 1 the inventor disclosed "A lift guiding system for a car curtain" comprising: a guiding rail in strip shape having a passage and an opening and a cover on the surface; a slide which is longitudinally movable set in said passage, joined with a rod of said curtain; and a rope which is connected with the folding system of the car curtain and fixed in the slide; thereby the rope is concealed in the passage, since the cover makes the outward appearance and interior trim unified; thus an aesthetic appearance is achieved.

The guiding rail is with a positioning part set on the interior trim, said positioning part has a U-shaped section for clipping on the destined edge of the interior trim (near the windshield). By setting the guiding rail, only disassembly of the destined edge on the interior trim is necessary, without disassembly of the whole interior trim, thus a guiding rail that is easily assembled and disassembled is achieved.

However, today there are various car types, wherein the interior trim of some car types is not set separatively, but fixed with e.g. components of a car seat. Therefore, even if only disassembly of the destined edge of the interior trim is necessary, it could take much time. Although a shortened guiding rail is advantageous for easy assembly, however, if the bottom of a shortened guiding rail cannot be connected to the folding system of a curtain, the top of the curtain cannot be folded in the folding system, especially the rope stays exposed.

Besides, since the relative position between the cover and the positioning part is fixed, the cover cannot stay close to the interior trim, in case the guiding rail is set on an interior trim with a large radian change. Thus an aesthetic problem of a poor appearance exists.

In view of these disadvantages the inventor tried the continuous testing and improvement and developed the present invention.

SUMMARY OF THE INVENTION

The main object of the present invention is to provide a guiding rail system for a car curtain that is easily assembled and disassembled.

For achieving above object the present invention comprises: a guiding rail main body in strip shape, which is separatively set on the interior trim on the sides of a windshield, wherein the guiding rail main body has a gliding groove set on the windshield and opening towards the windshield, for combination with a car curtain; it is characterized in that: plural positioning parts are sheets with a U-shaped section having a bottom, a front clipping piece, a rear clipping piece and an opening end, wherein said positioning parts are used for clipping on destined edge of the interior trim, for setting the front clipping piece on the outer surface of the interior trim; and plural snap pieces, wherein the first end of the snap piece is set in the guiding rail main body, while the second end of the snap piece is easily inserted in or detached from the gap between the front clapping piece and the interior trim. Thus a guiding rail main body that is easily assembled and disassembled is achieved.

The guiding rail main body has a longitudinal second gliding groove; the plural snap pieces are set in a gliding part respectively, wherein said gliding parts are distributed in the second groove of said guiding rail main body, thereby the positions of the plural snap pieces set in the guiding rail main body are adjustable.

The gliding part is a sheet having an outstanding part on the first side, wherein the first side and said outstanding part are together held on the same side in the second gliding groove of said guiding rail main body. Thereby longitudinal sliding resistance of the gliding part is generated.

Preferably, the guiding rail main body has a cover board, wherein the first side of the cover board is located on the outer surface of the gliding groove in the guiding rail main body, while the second side of said cover board extends to the interior trim; the snap pieces have an outstanding shape, that is, from the first end to the second end gradually moving away from the guiding rail main body. While the second end of the snap pieces gradually get into the gap between the front clipping piece and the interior trim, the opening end of the positioning part is gradually closed to the guiding rail main body, as result the second side of the cover board is closed to the interior trim. Thereby the cover board and the interior trim look like unified, and no aesthetic problem of poor appearance exists.

Preferably, the first end of said snap pieces extends along an accurate path to a second end, thereby, as the second end of the snap pieces gradually is inserted in the gap between the front clipping piece and the interior trim, the second side of the cover board is alone the arcuate path gradually closed to the interior trim, so that the cover board and the interior trim look like a unified body, and no aesthetic problem exists.

Preferably, the rear side of the front clipping piece of the positioning part has at least a recess; wherein the front side of the second end of said snap pieces has a protrusion, after the second end of said snap pieces is inserted in the destined distance between the front clipping piece and the interior trim, the protrusion is held in the recess, thereby falling-off of the guiding rail main body is prevented. Besides, the user is reminded, that snap pieces have been set in destined positions. As result, damage due to over insertion of the second end of the snap pieces is prevented.

Other aspects and advantages of the present invention will become apparent from the following detailed description, taken in conjunction with the accompanying drawings, illustrating by way of example the principles of the present invention.

BRIEF DESCRIPTION OF THE DRAWINGS

FIG. 4 is a perspective view of a positioning part of the present invention.

FIG. 5 shows the positioning parts of the present invention distributed on an interior trim.

DESCRIPTION OF THE PREFERRED EMBODIMENTS

Figure 1:
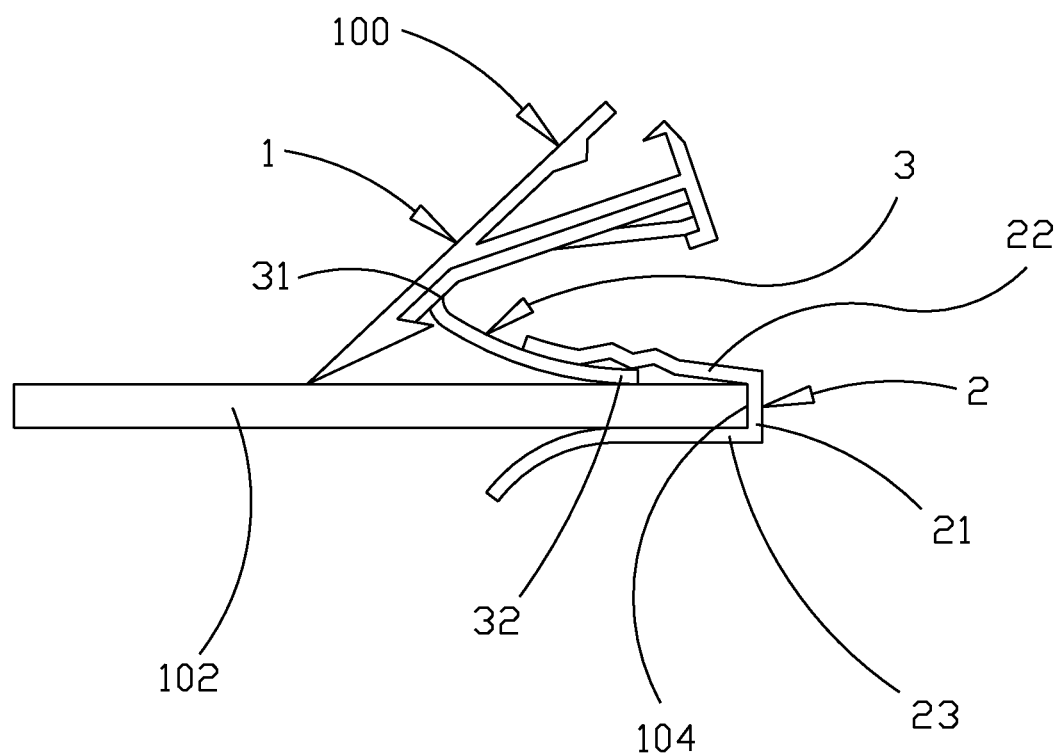
FIG. 1 shows the present invention set in an interior trim.
Figure 2:
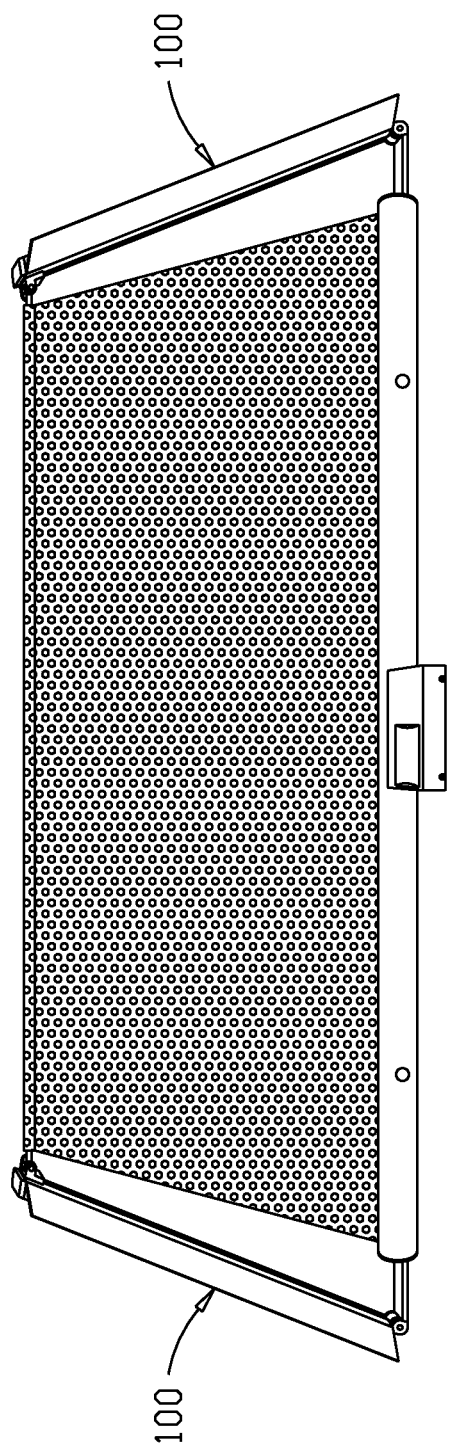
FIG. 2 shows the present invention in combination with a curtain.
Figure 3:
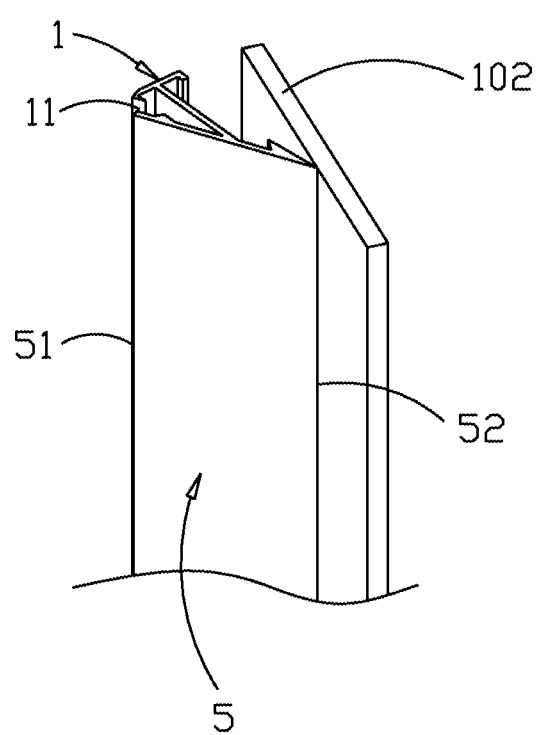
FIG. 3 shows the guiding rail main body of the present invention in combination with an interior trim.

As shown in FIG. 1-3, a guiding rail system 100 of a car curtain in the present invention comprises: a guiding rail main body 1 shaped like a strip, is separatively set on an interior trim 102 on both sides of a windshield, in combination with a car curtain (not shown); it is characterized in that: plural positioning parts 2 in sheet with an U-shaped section having a bottom 21, a front clipping piece 22 and a rear clipping piece 23 for clipping on the destined edge 104 of the interior trim 102; and plural snap pieces 3, wherein a first end 31 of the snap pieces 3 is set on the guiding rail main body 1, while a second end 32 of the snap pieces 3 is easily inserted in or detached from the gap between the front clipping piece 22 and the interior trim 102, thereby a guiding rail main body that is easily assembled and disassembled is achieved.

As shown in FIG. 2, a guiding rail system 100 is set on the interior trim on both sides of a windshield respectively in combination with a car curtain.

As shown in FIG. 3, the guiding rail main body 1 in strip shape, is separately set on the interior trim on both sides of a windshield. The guiding rail main body 1 has a gliding groove 11 set along the windshield and opening towards the windshield, wherein the gliding groove 11 is combined with a curtain system, e.g. as guide and support for a curtain, and keeps the rope concealed (not shown).

The guiding rail main body 1 is bent according to the shape of the interior trim, besides, after assembly, the same decoration as on the interior trim, e.g. a flannel of the same color, can be pasted on the surface, thereby, after setting the guiding rail system 100 for the car curtain, no aesthetic problem of poor appearance exists.

As shown in FIG. 4, plural positioning parts 2 in sheet with an U-shaped section having a bottom 21, a front clipping piece 22, a rear clipping piece 23 and an opening end 24, wherein the positioning parts are set on the destined edge of the interior trim, thereby the front clipping piece 22 is set on the outer surface of the interior trim.

As shown in FIG. 5, the positioning parts are distributed on the interior trim, wherein the interior trim 102 shows only part of the system for taking a view. As shown in FIG. 5, the positioning parts 2 are much shorter than the interior trim, therefore, if only part of the destined edge 104 of the interior trim is removed, is setting of the positioning parts 2 possible. Disassembly of all the destined edge 104 is not necessary. Even though it is not easy to remove the bottom of the interior trim, the positioning parts 2 can only be set at the middle positions, the guiding rail main body can still be connected with the folding system of the curtain (not shown). Thus a guiding rail main body that is easily assembled and disassembled is achieved.

Generally, plural positioning parts are equally distributed on the destined edge 104 of the interior trim, however, the amount and distance between the positioning parts are, depending on the situations, adjustable.

Figure 6:
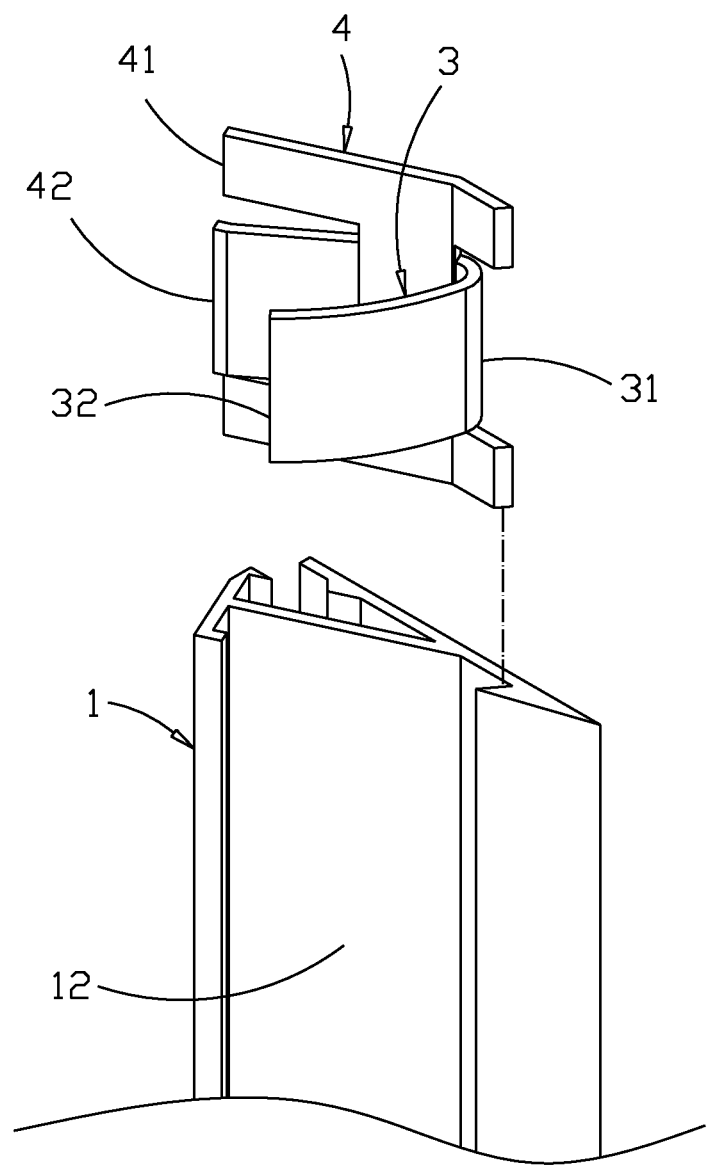
FIG. 6 is an exploded view of the guiding rail main body and a snap piece of the present invention.

As shown in FIG. 6, the guiding rail main body 1 has a longitudinal second gliding groove 12, and the first end 31 of the snap piece 3 is set on a gliding part 4, wherein the gliding parts 4 are distributed in the second groove of the guiding rail main body. Thereby it is easy to adjust the positions of the plurality of snap pieces set on the guiding rail main body, wherein the snap pieces 3 are set on the relevant positions of said positioning parts 2. The second end 32 of the snap pieces is easily inserted in or detached from the gap between the front clipping piece 22 and interior trim 102. Thus a guiding rail main body that is easily assembled and disassembled is achieved.

The snap pieces 3 in combination with the guiding rail main body are a preferred embodiment. The first end of the snap pieces 3 can also be fixed or in other way (not shown) connected with the guiding rail main body 1, while it is inserted in the gap between the front clipping piece 22 and the interior trim 102, the guiding rail main body 1 is set on the interior trim.

Furthermore, the gliding part 4 can also have a sheet shape, wherein the first side 41 has an outstanding part 42, wherein the first side and said outstanding part are together hold in the second gliding groove of the guiding rail main body on the same side. Thereby the longitudinal sliding resistance of the gliding part 4 is generated. Thus, as the snap pieces 3 and the gliding part 4 are pushed to destined positions, the gliding part 4 cannot easily move or get off.

Figure 7:
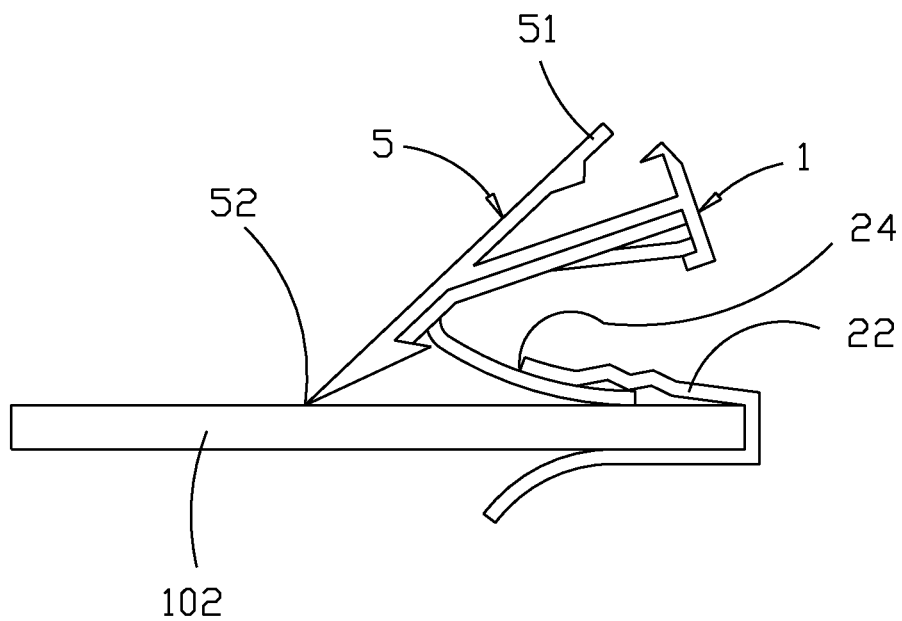
FIG. 7 shows a cover board of the present invention in combination with an interior trim.

As shown in FIG. 3 and FIG. 7, the guiding rail main body 1 has a cover board 5, wherein the first side of the cover board 51 is located on the outer surface located of the groove 11 of the guiding rail main body (that is, the viewed surface from the passenger seat in the auto), wherein the second side of the cover board 52 extends towards the interior trim 102 and leans on the interior trim. Thereby the cover board and interior trim look like a unified body, no aesthetic problem of poor appearance exists.

Furthermore, the snap pieces 3 can also have an outstanding shape, that is, having from the first end towards the second end an increasing distance from the guiding rail main body 1, so that, when the second end of the snap piece 32 is generally inserted in the gap between the front clipping piece 22 and the interior trim 102, the opening end of the positioning parts is generally closed to the guiding rail main body 1, the second side of the cover board is generally closed to the interior trim. Thereby, even if the guiding rail main body 1 is set on the interior trim with a large radians change, the cover board leaning on the interior trim is no problem.

Furthermore, the first end of the snap pieces 3 can along the accurate path extend to the second end, Thereby, the second side of the cover board is closed to the interior trim according to an arcuate path, while the second end of the snap pieces is generally inserted in the gap between the front clipping piece and the interior trim. As result, the cover board and the interior trim look like a unified body. No aesthetic problem of poor appearance exists.

Figure 8:
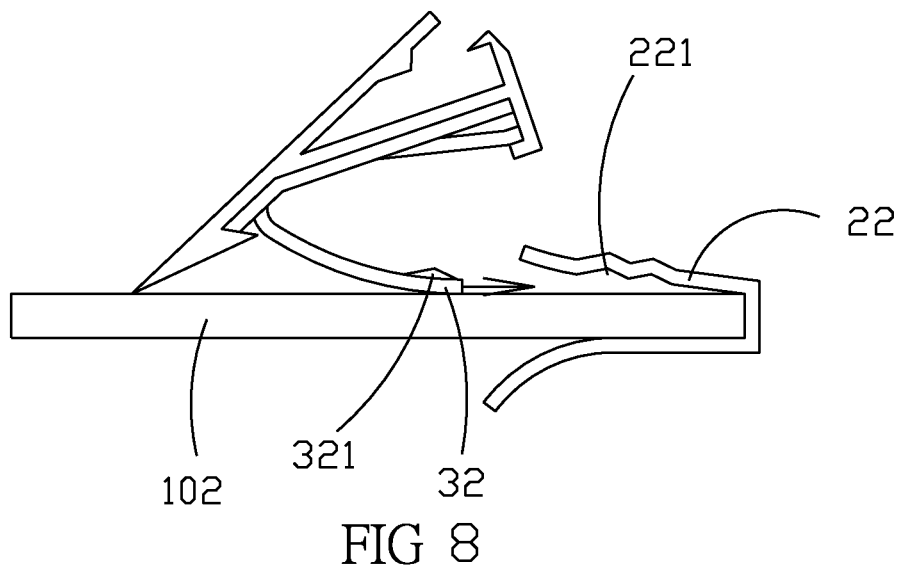
FIG. 8 shows a snap piece of the present invention in combination with a clipping piece of the present invention.

As shown in FIG. 8, the rear side of the front clipping piece 22 of the positioning parts has at least a recess part 221; while the front side of the second end of the snap piece 32 has a protrusion part 321, after insertion of the second end 32 of the snap piece in the destined distance between the front clipping piece and the interior trim 102, the protrusion part 321 is held in the recess part 221. Thereby, falling-off of the guiding rail main body 1 is prevented. Meanwhile, the user is reminded that the snap pieces have been set in the destined positions. Thereby, damage due to over insertion of the second end of the snap pieces in the gap between the front clipping piece and the interior trim is prevented.

The invention claimed is:
1. A guiding rail system for a car curtain, comprising:
Two guiding rail main bodies on the interior trim on two sides of a car window;
   wherein the guiding rail main body has a gliding groove along the windshield and opening towards the windshield, a car curtain;
- plural positioning parts with a U-shaped section, having a bottom, a front clipping piece, a rear clipping part and an open end; wherein said positioning parts are clipped on a edge of the interior trim, wherein the front clipping piece is set on an outer surface of the interior trim; and
- plural snap pieces, wherein a first end of each snap piece is on the guiding rail main body, while a second end of each snap piece is optionally inserted in or detached from the gap between the front clipping piece and the interior trim,
- wherein the guiding rail main body has a longitudinal second gliding groove; and there is a plurality of gliding parts distributed in the second groove of the guiding rail main body,
- wherein the guiding rail main body has a cover board, wherein a first side of the cover board is located on an outer surface of the gliding groove of the guiding rail main body, while a second side of the cover board extends towards the interior trim.

2. The guiding rail system for a car curtain of the claim 1, wherein the first end of each snap piece extends along an arcuate path to the second end.

3. The guiding rail system for a car curtain of the claim 1, wherein the rear side of the front clipping piece of the positioning parts has at least one recess part;
- wherein a front side of the second end of each snap piece has a protrusion part, wherein the protrusion part is held in said recess part.

* * * * *